United States Patent
Meditz

(10) Patent No.: US 6,996,191 B1
(45) Date of Patent: Feb. 7, 2006

(54) EFFICIENT ACCURATE CONTROLLER FOR ENVELOPE FEEDFORWARD POWER AMPLIFIERS

(75) Inventor: Joseph Raymond Meditz, San Diego, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 09/409,818

(22) Filed: Sep. 30, 1999

(51) Int. Cl.
*H04L 27/20* (2006.01)

(52) U.S. Cl. .................................................. 375/308
(58) Field of Classification Search ............... 375/308, 375/295, 302, 279, 273
See application file for complete search history.

(56) References Cited

U.S. PATENT DOCUMENTS

| | | | |
|---|---|---|---|
| 6,222,878 B1 * | 4/2001 | McCallister et al. | 375/225 |
| 6,421,398 B1 * | 7/2002 | McVey | 375/308 |

* cited by examiner

*Primary Examiner*—Khai Tran
(74) *Attorney, Agent, or Firm*—Weide & Miller, Ltd.

(57) ABSTRACT

The disclosure is directed toward improved methods and apparatus for producing PSK signals. Commonly, such signals as Differential Quadrature Phase Shift Keying (DQPSK) are produced by coupling the outputs of an encoder to finite impulse response (FIR) filters. The filters shape the path that the signal takes between the transmission of one symbol and the next symbol The present disclosure discloses a method of generating a signal so that the path taken between transmitted symbols is determined by looking up the intermediate values along the path, using a look-up table. An embodiment of the disclosure receives the present symbol and the next symbol to be transmitted and then serially accesses a series of intermediate points comprising a preferred signal path between the present symbol and the next symbol to be transmitted. Commonly some PSK signals are transmitted by processing the phase and the amplitude of the signal separately. In those applications it is common to delay the amplitude portion of the signal in an analog delay line in order to ensure that the recombined signal will have the proper relationship of phase and amplitude. One preferred embodiment adds a phase offset to the phase signal instead of adding a delay to the amplitude signal. Another preferred embodiment performs phase amplitude synchronization by introducing phase offsets in the look-up table values which represent the signal path between sequentially transmitted signals. The phase offset achieves the same result as the traditional amplitude delay mechanism in synchronizing the phase and amplitude portions of the signal without the traditional delay line hardware.

19 Claims, 7 Drawing Sheets

BPSK

QPSK

π/4 DQPSK

π/4 DQPSK Signal Trajectory

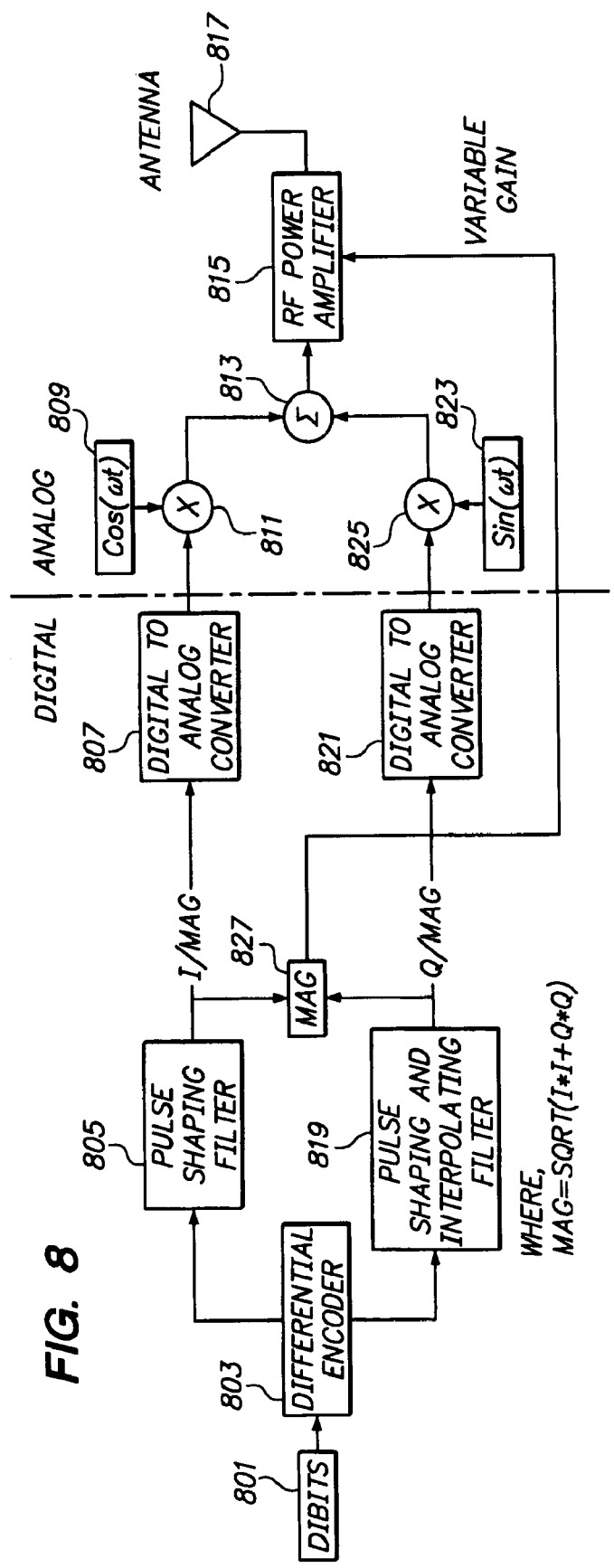

EFFICIENT ACCURATE CONTROLLER FOR ENVELOPE FEEDFORWARD POWER AMPLIFIERS

FIELD OF THE INVENTION

This invention relates to Phase Shift Keying (PSK) modulators used in communication systems for the purpose of modulating signals with digital data, and in particular embodiments to methods and apparatus for determining the phase and amplitude of non-constant envelope signals produced by PSK modulators and for controlling a power amplifier.

BACKGROUND OF THE INVENTION

Phase Shift Keying (PSK) is a method for modulating an analog carrier signal with a digital data signal. In PSK the phase of a carrier signal, such as a Sine wave, changes depending on the input data information bits being transmitted. FIG. 1 illustrates a basic form of Phase Shift Keying commonly known as Binary Phase Shift Keying or BPSK. Referring to FIG. 1, waveform 101 represents a digital data signal. In the digital signal 101 a binary "1" is transmitted in time slot 105, a binary "1" is transmitted in time slot 107, a binary "0" is transmitted in time slot 109, a binary "1" is transmitted in time slot 111, a binary "0" is transmitted in time slot 113, a binary "0" is transmitted in time slot 115 and a binary "1" is transmitted in time slot 117.

The BPSK signal, derived from the 101 waveform, is shown in FIG. 1 as waveform 103. Between time periods 107 and 109 the data changes from a "1" to a "0" this transition is reflected in the 180° phase reversal, as seen at point 119, within the BPSK signal 103. Similarly the data transitions between period 109 & 111, 111 & 113, and 115 & 117 are reflected as 180° phase reversals at points 121, 123, and 125, within waveform 103, respectively.

A BPSK signal 207 may be generated by the mechanism of FIG. 2. In FIG. 2 a BPSK output 207, is generated by a switch which selects between a +1 203 and −1 205 and then multiplies either a +1 203 or −1 205 times the a Sin(x) carrier 201, producing a −Sin(x) carrier or a +Sin(x) carrier 205.

PSK is not limited to only two phases. Quadrature Phase Shift Keying (QPSK) uses four carrier phases, instead of two carrier phases, to create the modulated signal. In general a multitude of phases may used create Phase Shift Keying modulated signals, such multiphase phase shift keying signals are often referred to as Multiple Phase Shift Keying (MPSK) signals. In addition a signal may have further modulation, such as amplitude modulation, impressed on it. For example 16 QAM (Quadrature Amplitude Modulation) uses 12 carrier phases and 3 different amplitudes as signal modulation.

QPSK modulation is advantageous in that each phase change may be used to encode more than one bit of data. Commonly, in QPSK, a phase change represents two bits of data. The two bits of data encoded within a QPSK signal are commonly portrayed as quadrature vectors, as illustrated in FIG. 3. In FIG. 3 a phase shift of 45°, i.e. vector 301, represents bit pair 00, a phase shift of 135°, i.e. vector 303, represents bit pair 01, a phase shift of 255°, i.e. vector 305, represents bit pair 10, and a phase shift of 315°, i.e. vector 307, represents bit pair 01. These pairs of bits are commonly referred to as dibits or symbols. In general distinct information states of PSK signals are commonly referred to as symbols. A symbol may contain several bits of information.

In order to correctly recover binary data encoded using PSK techniques, the phase of the received signal may be compared to a reference signal. This can be accomplished by coupling the received signal into a balanced demodulator and providing a reference signal, whose frequency and phase is identical to the carrier, that was used to modulate the signal. Because of the necessity of providing a signal, which has a phase and frequency identical to the carrier signal used in the modulation process, balanced demodulator type circuitry can be complex and expensive. In order to remove the dependence on producing a carrier whose frequency and phase is identical to the carrier that was used to modulate the signal, differential PSK techniques may be used. In differential PSK (DPSK) there is no absolute phase, so there is no dependence on providing a carrier whose frequency and phase is identical to the carrier that was used to modulate the signal. The binary data is recovered from a DPSK signal by comparing the phase of the signal being received to the phase of the previous symbol received. Comparing a symbol to the previous symbol received removes the dependency on an absolute reference signal, that may be present with the non-differential methods of PSK signaling.

$\pi/4$ DQPSK uses phase shifts of $\pm\pi/4$, $\pm 3\pi/4$ to avoid zero amplitude signals. $\pi/4$ DQPSK is used in cellular telephony. This invention can well be applied to $\pi/4$ DQPSK, for example. For the purpose of representing phase modulated signals, I/Q diagrams are often employed. I/Q diagrams commonly depict Q as a vertical axis and I as the horizontal axis. The I axis represents the in phase part of the signal vector and Q axis represents the quadrature portion of the signal vector. A signal can be represented as a vector rotating in the I/Q plane with the length of the vector representing the amplitude of the signal, as shown in FIGS. 3a, 3b, 3d, 5a, 5b.

Linear amplifiers are commonly class A amplifiers. A class A amplifier is an amplifier in which a quiescent current is flowing, even when no signal is present. Generally class A amplifiers are significantly less efficient that class C amplifiers, which only consume power when they are amplifying a signal. Class C amplifiers are particularly suited to amplifying phase modulated signals, and it is often a common practice to employ Class C amplifiers when amplifying phase modulated signals. It is a common practice, when amplifying PSK signals, to separate the phase and amplitude components. If the amplitude and phase components are separated, the constant amplitude phase portion may be amplified in a class C type amplifier followed by an amplitude modulator to restore the envelope of the signal. In such implementations, where the phase and amplitude portion of the signals are processed separately, it is common to employ a delay in the amplitude signal in order to synchronize the phase and amplitude before recombining the phase and amplitude portions of the signal.

Generating PSK type signals presents several problems. One of the problems that can be encountered occurs during the modulation of the signal. If the transmit filtering is not done accurately, the spectral shape of the signal will be incorrect. Errors in transmit filtering will also degrade performance at the receiver owing to poorly matched filters. Also, the quality of the transmit signal is sensitive to timing synchronization errors when the phase and amplitude components are recombined.

Additionally, in implementations in which the phase and amplitude are separated and then recombined, various factors such as temperature, aging of components, and the like can introduce delay errors into the recombination of the signals. In addition such delay methods can involve delay lines which may be a significant expense. Improved methods of generating PSK signals are needed in the art.

SUMMARY OF THE DISCLOSURE

The present disclosure presents methods for generating and amplifying phase shift keying waveforms, in which the phase and amplitude portions are in the proper synchronization.

In accordance with an embodiment of the present invention a state machine is used to generate the broadcast signal. In this embodiment the state machine reads the current transmit filter state as well as the next symbol to be encoded. The state machine then accesses a series of points stored in ROM which represent the ideal baseband signal trajectory when making the transition between the current filter state and the next filter state determined by the new symbol.

A second preferred embodiment achieves synchronization of the phase and frequency components of the PSK signal. The synchronization of the phase and frequency components of the PSK signal is not accomplished in the traditional manner of inserting a delay in the amplitude amplification path of the signal that has been split into amplitude and phase portions, rather, a phase offset is added to the phase amplification portion of the signal. This offset not only provides a convenient way of insuring that the phase and amplitude portions of the signal are synchronized accurately when they are recombined, it also provides a convenient method of dynamically correcting the amplitude and phase portions of the PSK signal. The delays of the phase and amplitude components of the signal may shift as the unit warms up, the components age, or a variety of other factors, and a phase offset capability can be a convenient way of correcting the varying signal propagation time.

BRIEF DESCRIPTION OF THE DRAWINGS

FIG. 8 is a block diagram of an envelope feedforward power amplifier configuration, which can be used to ensure alignment of the phase and amplitude of a Phase Shift Keying (PSK) signal;

DETAILED DESCRIPTION OF PREFERRED EMBODIMENTS

Figure 1:
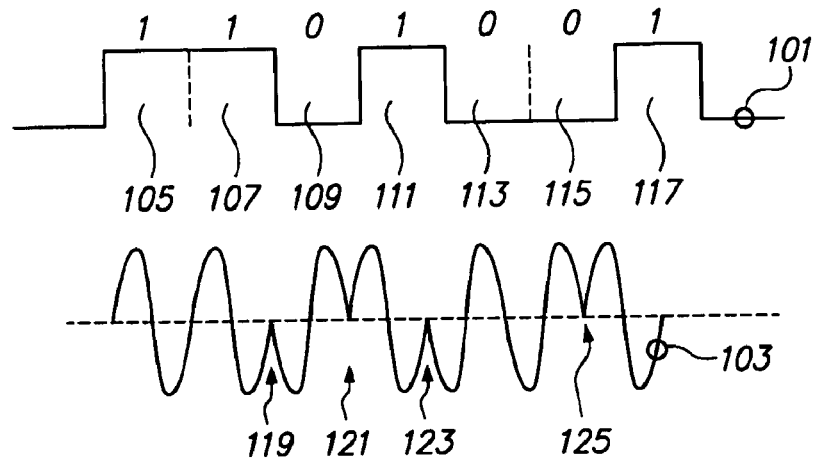
FIG. 1 is a graphical illustration how binary data is represented, as 180° phase shifts, in a Binary Phase Shift Keying (BPSK) signal.
Figure 2:
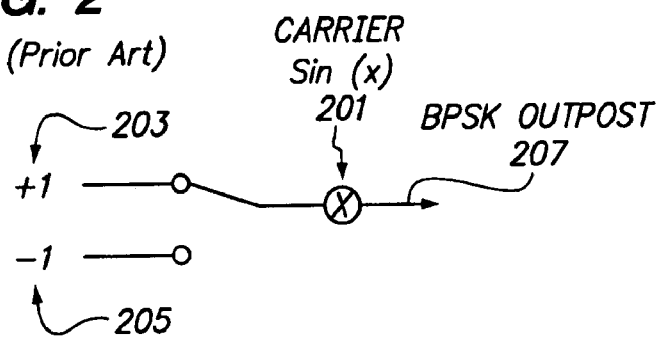
FIG. 2 is a general block diagram of a mechanism for generating BPSK signals.
Figure 3A:
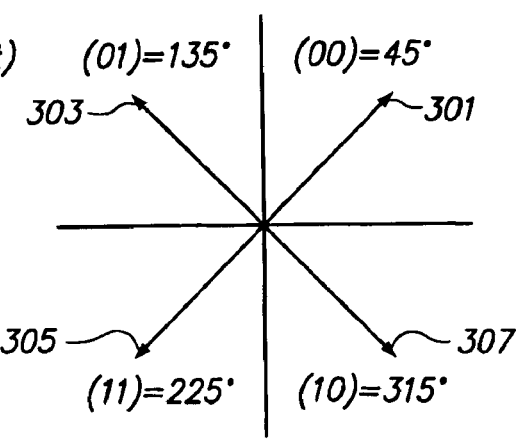
FIG. 3a is a graphical representation, often referred to as a constellation, of signal phase and data encoding of a Quadrature Phase Shift Keying waveform.
Figure 3B:
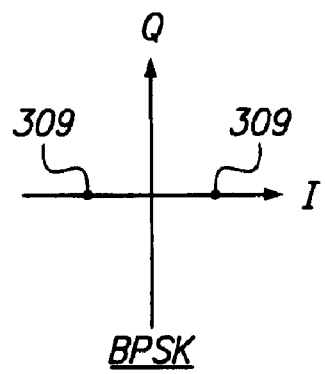
FIG. 3b is a constellation of signal phase and data encoding of a Binary Phased Shift Keying waveform.
Figure 3C:
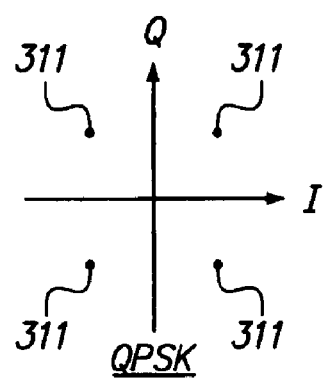
FIG. 3c is a constellation of signal phase and data encoding of a Quadrature Phased Shift Keying waveform.
Figure 3D:
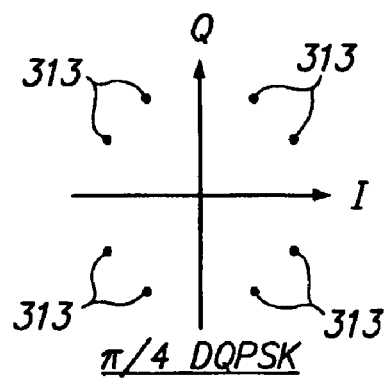
FIG. 3d is a constellation of signal phase and data encoding of a π/4 Differential Quadrature Phased Shift Keying (DQPSK) waveform.
Figure 4:
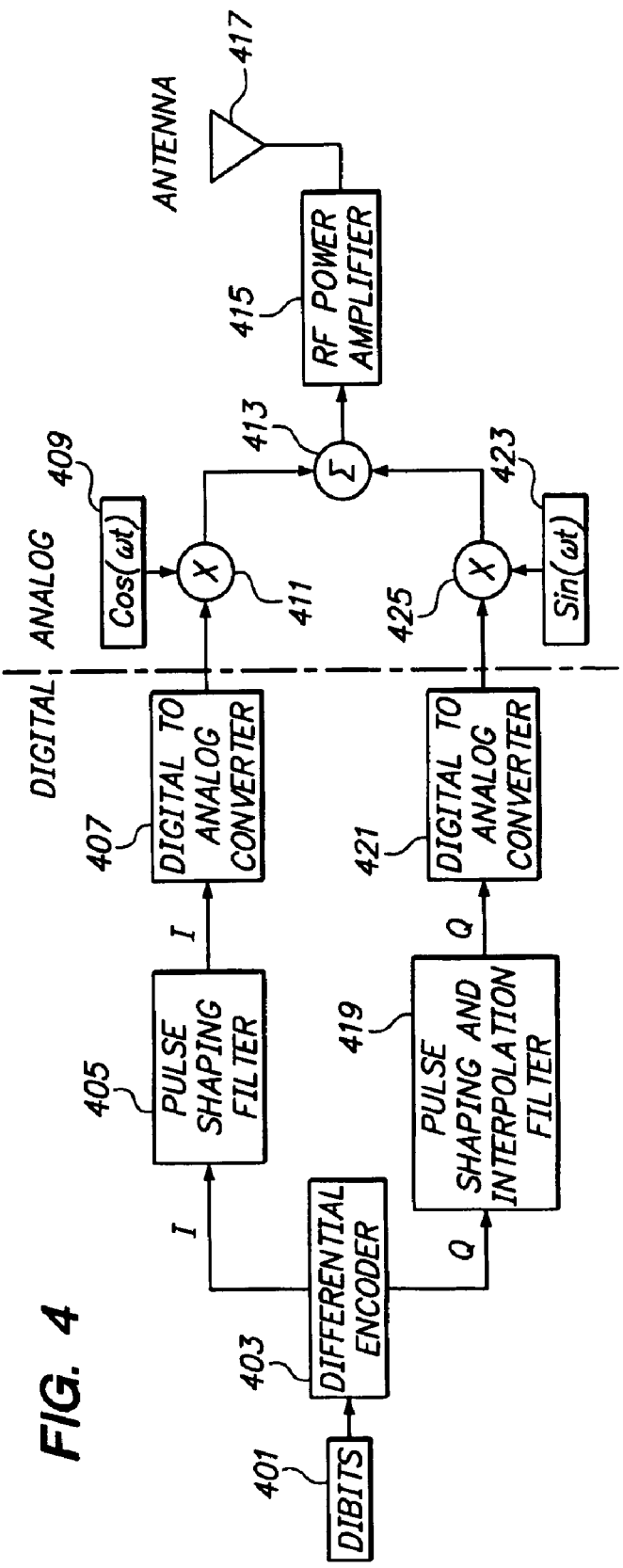
FIG. 4 is a block diagram of an exemplary Differential Phase Shift Keying transmitter.

FIG. 4 is block diagram of a typical example of a DQPSK (Differential Quadrature Phase Shift Keying) transmitter. The data symbols, or dibits 401, are coupled into the Differential Encoder 403. The differential encoder then encodes the current symbol by comparing it to the previous symbol and generating I and Q components of the result. The I, or in-phase signal from the differential encoder 403, is coupled into a pulse shaping filter 405, which shapes the transition between the current I value and the previous I value. The output of the pulse shaping filter 405 is provided to a digital to analog converter 407. The analog output of the digital to analog converter 407 is then used to modulate, in modulator 411, a cos(ωt) carrier 409. The modulated signal, from the output of the Modulator 411, is then coupled into the summing circuit 413.

The Q, or quadrature signal output of the differential encoder 403, is coupled into a pulse shaping and interpolating filter 419, which shapes the transition between the current Q value and the previous Q value. The output of the pulse shaping filter 419 is then provided to the digital to analog converter 421. The analog output of the digital to analog converter 421 is then used to modulate, in modulator 425, a Sin(ωt) carrier 423. The modulated signal is then provided to the summing circuit 413, where it is summed with the output of the I modulator 411. The resulting signal is provided to RF power amplifier 415, which amplifies the signal. The amplified signal from the RF Power amplifier 415, is then broadcast from the antenna 417.

Figure 5A:
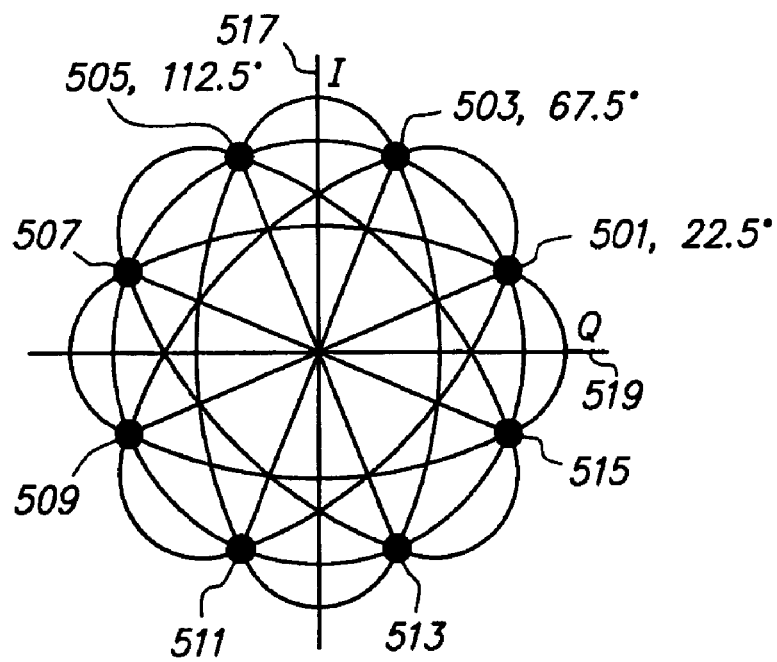
FIG. 5a is a graphical representation of a Differential Phase Shift Keying signal trajectory with pulse shaping represented in the I, Q plane, showing various signal paths between symbols.
Figure 5B:
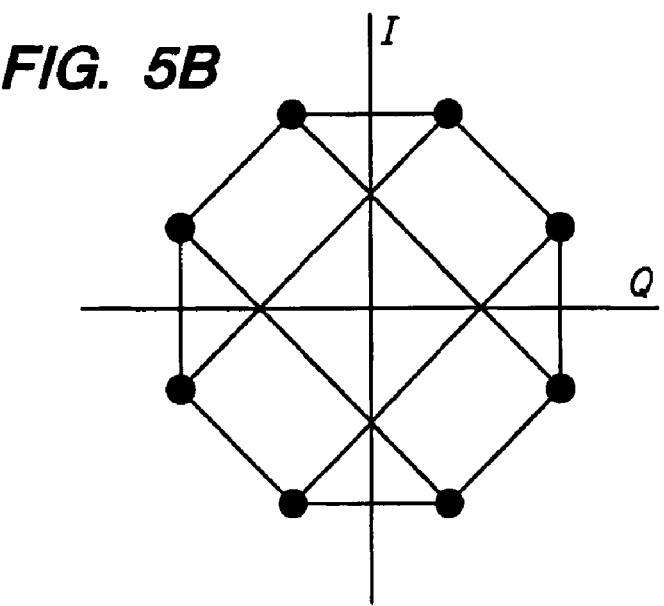
FIG. 5b is a graphical representation of a Differential Phase Shift Keying signal trajectory without pulse shaping represented in the I, Q plane, showing various signal paths between symbols.

The symbols that are transmitted by the example DQPSK transmitter that is illustrated in FIG. 4, are shown in FIG. 5. There are a total of 8 symbols, i.e., 501, 503, 505, 507, 509, 511, 513 and 515. Each symbol is separated from its nearest neighbor symbol by 45°. Since DQPSK is a differential signal, to recover the original data stream, sequentially received symbols must be subtracted. In a DQPSK signal as shown FIG. 5 the trajectories that a DPQSK signal can use to transition between symbols are shown. Only transitions of +/−45° or +/−135° are permitted. This is so, because if transitions of 180° were permitted, the signal trajectory would go through the origin and the amplitude of the signal would, at the time the signal crossed the origin, be zero. A zero amplitude signal is an undesirable condition from the standpoint of amplifier operation. Transitions of 90° are merely successive transitions of 45°. In other words a transition of 90° involves a path which takes the signal through the 45° point. Because of the restriction of not permitting 180° transitions, if symbol 501 were being transmitted then the next symbol encountered could be 503 (+45°), 515 (−45°), 507 (135°) or 511, (−135°). Several of the trajectories that may be taken as the signal transitions between symbols are shown. The path between signals are shown as smooth, regular paths. If the paths between symbols were not smooth and regular they would contain spurious higher frequency components that would then add to the bandwidth of the signal, thereby creating out of bandwidth signals (noise) and wasting the energy that goes into producing the noise. The system must therefore not only control the symbols that are transmitted, it must also control the path the signal takes between symbols. The paths illustrated in FIG. 5a are smooth and regular because they have been produced with the aid of pulse shaping. It is therefore advantageous, for the performance of the system, to precisely define the path taken between symbols, in order to eliminate the generation of spurious frequency components. The path between symbols in this embodiment can be defined by specifying several sample points of signal values between symbols, thereby defining the path that the signal traverses as it makes the transition between symbols. FIG. 5b is an illustration of a π/4 DQPSK signal trajectory without pulse shaping. As can be seen from the figure the transitions between signals produce sharp discontinuities. Such sharp discontinuities can create spurious noise and unwanted high frequency components.

Figure 6:
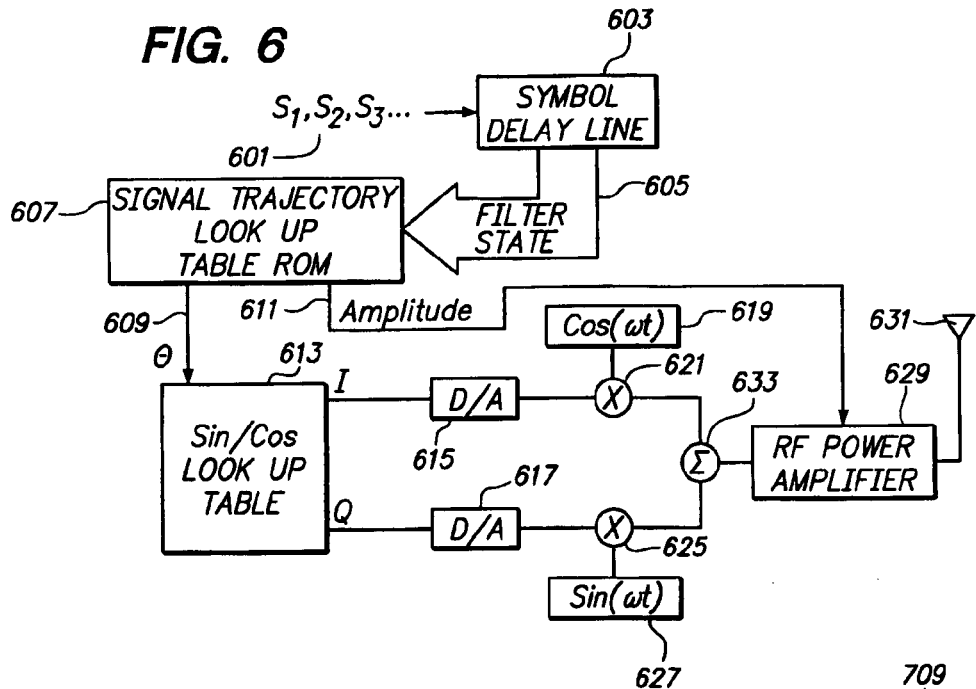
FIG. 6 is a block diagram illustrating one embodiment of the present invention that uses a look-up table to achieve phase rotation.

A preferred embodiment of the present disclosure, using the eight symbols discussed above, controls the path between symbols by specifying the sample points between symbols. This embodiment is illustrated in FIG. 6. These sample points represent intermediate values between symbols. These intermediate values are preferably generated in equal time increments. The number of samples needed between symbols can vary depending on design parameters and depending on how closely a signal must be controlled. For some applications, including the present illustrative embodiment, 4 samples between figures is considered adequate. The present embodiment is illustrated as part of DQPSK mechanism also shown in FIG. 6. In this embodiment all the sample points are contained in a look-up table. In FIG. 6, 601 represents symbols being coupled into a symbol delay line 603. The output of the interpolation digital filter is a filter state 605. The filter state 605 is coupled into a signal trajectory lookup table 607. The signal trajectory lookup table accepts the filter state 605 and produces a phase angle data 609 and an amplitude 611. The phase angle data 609 is coupled into a sine and cosine lookup table 613, while the amplitude 611 is coupled to the RF amplifier to reconstruct the envelope of the signal.

The number of bits of address that is provided by the look-up ROM 607 of FIG. 6 depends on the number of samples that are used to define the path between symbols. If 6 symbols are used, as in the present embodiment, then the sample counter 602 would need to provide 18 bits of address to the look-up ROM. As the symbols are accepted, the successive values for I and Q are accessed from the ROM 607. All the successive I and Q values to traverse from any one symbol to any allowed next symbol are contained within the look-up ROM 613.

The I value thus accessed is coupled into an D/A register 615 and the Q value thus accessed is coupled into an D/A register 617. The output of the D/A register 615 is used by modulator 621 to modulate a Cos(ωt) carrier 619. The output of the D/A register 617 is used by modulator 625, to modulate a Sin(ωt) carrier 625. The output of modulator 621 and modulator 625 are then combined in summing circuit 623. The sum of the two signals is then coupled into the RF amplifier 629, where it is amplified and broadcast by the antenna 631.

PSK signals such as BPSK, DQPSK, QPSK, and QAM ordinarily are amplified in order to be broadcast. It is common practice in the art to separate the phase component and the frequency component of such signals and amplify them separately as discussed in "Single-Sideband Transmission by Envelope Elimination and Restoration" by Leonard R. Kahn, Proceedings of the I.R.E., V40, 1952, which is incorporated herein by reference. This procedure is effective, in part, because by separating the signal into phase and amplitude portions, highly efficient class C type amplifiers may be employed in amplifying the phase modulated portion of the signal.

Figure 7:
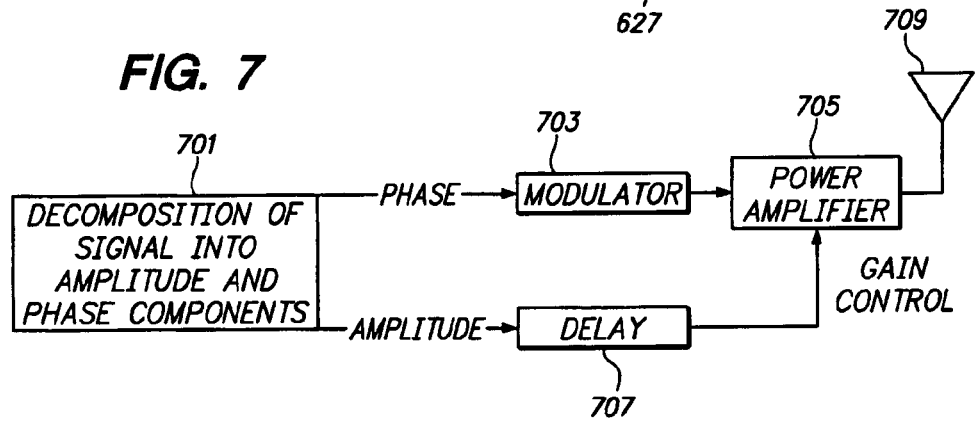
FIG. 7 is a block diagram of a common phase and amplitude alignment scheme for a Phase Shift Keying (PSK) modulated signal.

A procedure that utilizes separated phase and amplitude portions of a signal is illustrated in the block diagram of FIG. 7. The signal to be encoded is decomposed into phase and amplitude portions in block 701. The phase signal is then typically coupled into a modulator 703, to impress the phase signal on the carrier, and then into a power amplifier 705. The amplitude signal is coupled into a delay circuit 707. A delay is placed in the phase portion of the circuit because the phase portion can take longer to propagate through the circuitry than the respective amplitude information. The output of the delay 707 is then used to control the amplification of the power amplifier 705. Thus the amplitude and the phase portions of the signal are recombined, amplified and broadcast by the Antenna 709.

Other methods, such as shown in FIG. 8, may be used to determine the amplitude and the phase portions of a PSK signal. This feed-forward signal can be developed from the I and Q signals by calculating the magnitude by taking the square root of $I^2+Q^2$, which is the current amplitude of the PSK signal. The phase, or constant amplitude portion, is obtained by normalizing I and Q and dividing by the magnitude.

In FIG. 8, the data symbols, such as dibits 801, in the present embodiment, are coupled into the differential encoder 803. The differential encoder 803 then compares the symbol to the previous symbol and forms I and Q components of the result of the comparison. The I (in-phase) signal from the differential encoder 803, is provided to a pulse shaping filter 805. The output of the pulse shaping filter 805, is further provided to a digital to analog converter 807. The analog output of the digital to analog converter 807 is then used to modulate, in modulator 811, a Cos(ωt) carrier 809, the modulated signal is then provided to the summing junction 813.

The Q (quadrature) signal output of the differential encoder 803, is provided to a pulse shaping filter 819. The output of the pulse shaping filter 819 is then provided to the digital to analog converter 821. The analog output of the digital to analog converter 821 is then used to modulate, via modulator 825, a sin(ωt) carrier 823 the modulated signal is then provided to the summing junction 813 where it is summed with the output of Modulator 811. The resulting signal is provided to RF power amplifier 815. The output of the pulse shaping filter 805 (I magnitude) and the output of the pulse shaping and interpolating filter 819 (Q magnitude) are coupled into the Mag (magnitude block) 827. By taking the square root of $I^2+Q^2$, the magnitude of the feed-forward signal, composed of I and Q, is determined. The magnitude of the resultant signal is then used to control the output of the RF power amplifier 815, thereby providing the correct amplitude for the PSK signal.

While the magnitude determination method of feed-forward power correction is effective, it may require a great deal of computation. For every sample point the magnitude of the vector needs to be determined. This determination typically involves squaring the value of the I portion, squaring the value of the Q portion, adding them, taking the square root and then dividing I and Q by the magnitude of the result. Synchronization can be achieved by delaying the amplitude by adding a hardware delay line. Adding a hardware delay line can be costly, however, especially in cost sensitive applications.

Figure 9:
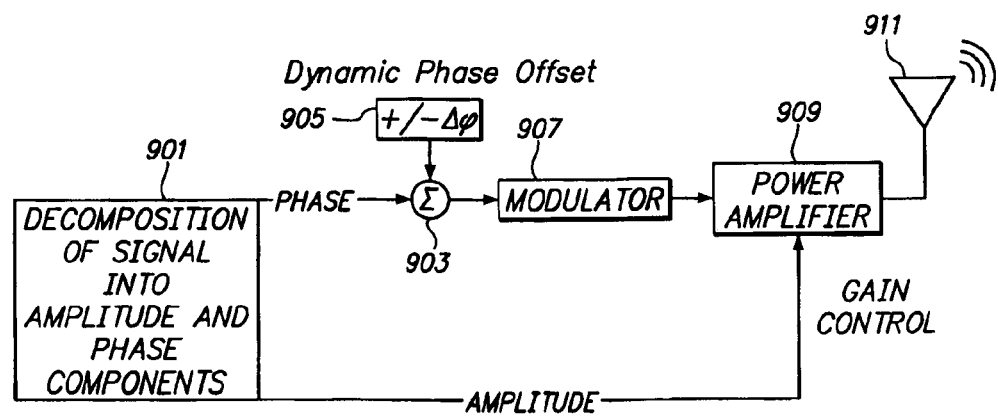
FIG. 9 is a block diagram of an embodiment of the invention, illustrating the manner in which synchronization of the phase and amplitude information can be achieved by adjusting the phase of the signal.

Instead of delaying the amplitude portion of the signal, or feeding forward a gain control signal, another approach is to incorporate an offset into the phase of the PSK signal, the idea being that a phase offset in the frequency domain is equivalent to a delay in the time domain provided that the frequency is constant. However, the instantaneous frequency of a π/4 DQPSK signal is not constant. In order to convert Δt into Δθ, an estimate of the instantaneous frequency is required. Provided the sampling rate is "sufficiently high" the instantaneous frequency may be estimated by the first order difference θ[h]−θ[n−1]. The instantaneous phase adjustment is then K(θ[h]−θ[n−1]) where K is proportional to the desired time delay which is assumed to be a small fraction of the symbol rates. An example embodiment, which incorporates an offset into the phase portion of the signal, is shown in FIG. 9. In block 901 of FIG. 9 the phase portion of the signal is separated from the amplitude portion of the signal, using methods well known in the art. Block 905 then defines a positive or negative phase, which is then combined with the phase portion of the signal in summing block 903. The phase offset signal is then coupled into the modulator 907, in order to translate the signal to the proper frequency for broadcast, and then provided to the power amplifier 909 and subsequently broadcast 911. The phase offset requires one subtraction and a scaling operation by the factor K.

Figure 10:
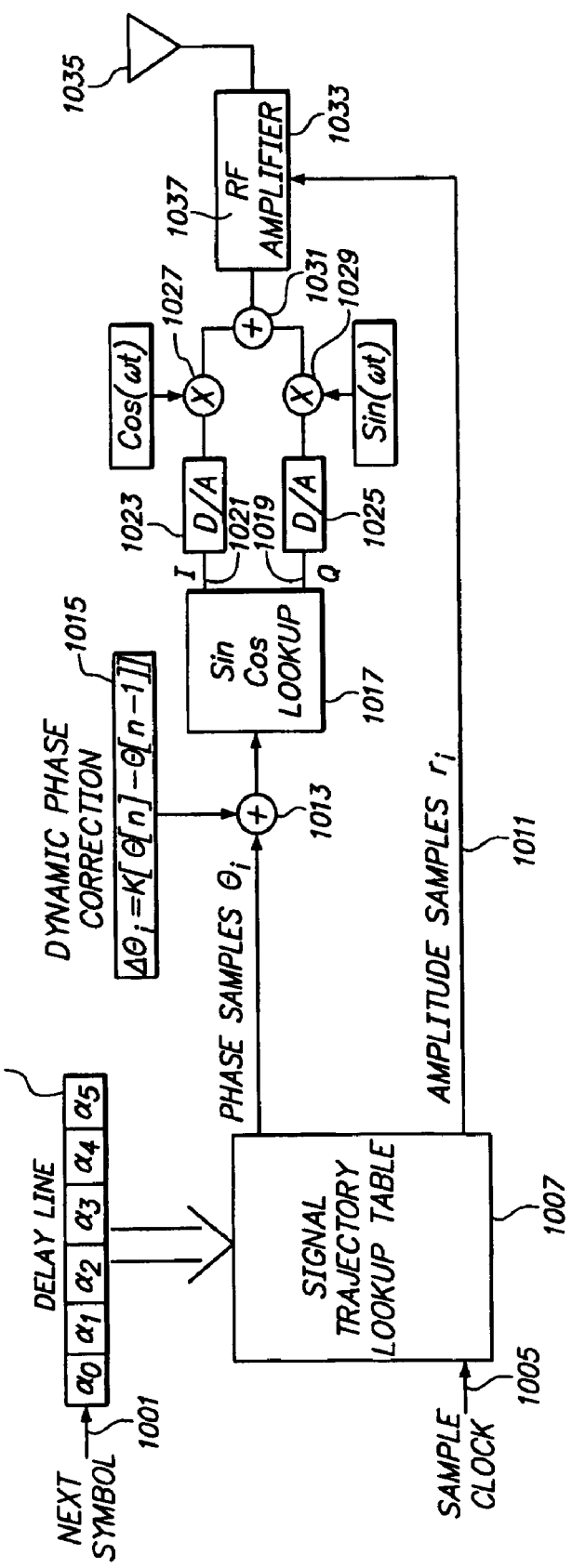
FIG. 10 is an embodiment of the invention, that uses a look-up table and phase rotation, as they might be embodied in an application, incorporating dynamic phase correction.

FIG. 10 is an embodiment of the invention that uses a lookup table and phase rotation as they might be embodied in an application incorporated dynamic phase correction. In FIG. 10 symbols 1001 are coupled into a delay line 1003. The delay line 1003 is further coupled into a signal trajectory lookup table 1007. The signal trajectory lookup table is clocked by a sample clock 1005. The output from the signal trajectory lookup table 1007 is phase samples data $\theta_I$ 1009 and amplitude samples $r_I$ 1011. The phase samples are summed in a summation block 1013 with a dynamic phase correction equation 1015. The factor K controls the amount of delay. K must be selected for the particular hardware, and may be determined experimentally. The output of the summation block 1013 is coupled into a sine cosine lookup table 1017. The sine cosine lookup table then provides an I vector 1021 and a Q vector 1019, each of which are coupled into to digital to analog converters 1023 and 1025, respectively. The output of digital to analog converter 1023 is then multiplied in a multiplication block 1027 by a cos(ωt) carrier. The output of the digital to analog converter 1025 is multiplied by a sin(ωt) carrier in multiplication block 1029. The output of both multiplication blocks 1027 and 1029 are then coupled into a summation unit 1031. The output of the summation 1031 is then coupled into a RF amplifier 1037 to be amplified. The amplitude samples 1011 from the signal trajectory lookup table modulate the amplitude of the RF amplifier 1033. The signal thus amplified is then broadcast from an antenna 1035.

The foregoing description of the exemplary embodiments of the present disclosure has been presented for the purposes of illustration and description. It is not intended to be exhaustive or to limit the inventive concepts to the precise embodiments disclosed. Many modifications and variations are possible in light of the above teaching. It is intended that the scope of the invention be limited not with this detailed description, but rather by the claims appended hereto, which appear below

I claim:

1. A method of creating a phase shift keying modulated signal, the method comprising:
   reading a filter state;
   selecting a new symbol;
   determining a preferred signal path between said filter state and said new symbol;
   retrieving, from a storage device, intermediate values that lie, between a first symbol and a second symbol, on the preferred signal path; and
   using said intermediate values to generate said preferred path between said first symbol and said second symbol.

2. The method of claim 1 further comprising storing data points, representing intermediate values at equal time increments along said preferred signal path, between said first symbol and said second symbol, in said storage device.

3. The method of claim 1, further comprising the step of: storing said intermediate values in a look-up table.

4. The method of claim 3, wherein said step of storing further comprises: storing said intermediate values as I and Q vectors.

5. The method of claim 3, wherein said step of storing further comprises: storing said intermediate values as R and θ vectors.

6. The method of claim 3, further comprising the step of: using said first symbol and a digital filter state as an index for the look-up table.

7. The method of claim 3 further comprising the steps of: using a sample counter to generate a count signal; and
   using said count signal as an index for said look-up table.

8. The method of claim 3 wherein said step of storing further comprises: storing said intermediate values in a non volatile electronic memory.

9. The method of claim 3, the method further comprising the step of: generating data points that correspond to said preferred signal path between said first symbol and said second symbol.

10. The method of claim 9 wherein said step of storing further comprises: storing said look-up table in an electronic memory device.

11. An apparatus for creating a phase shift keying modulated signal comprising:
    a first storage device that stores a representation of a first symbol and generates a first index signal;
    a second storage device that stores a representation of a second symbol and generates a second index signal;
    a sample counter that generates a count signal that is representative of the number of samples between said first symbol and said second symbol; and
    a look-up table that generates intermediate values between the first and second symbols in response to said first index signal, said second index signal, and said count signal.

12. The apparatus of claim 11, wherein said look-up table comprises an electronic memory containing signal values.

13. The apparatus of claim 11 wherein said look-up table comprises a look-up table that generates adjusted values, said adjusted values including a phase offset.

14. The apparatus of claim 11, wherein the look-up table comprises look-up table that generates I and Q values.

15. The apparatus of claim 11, wherein the look-up table comprises a look-up table that generates R and θ values.

16. An apparatus that adjusts a phase portion independently of an amplitude portion of a phase shift keying (PSK) signal, the apparatus comprising:
- a phase shift keying (PSK) signal generator that generates said PSK signal;
- a decomposition circuit that separates amplitude and phase components of said PSK signal to produce a PSK phase component signal and a PSK amplitude component signal;
- a phase offset generator that generates a phase change signal; and
- a summing circuit connected to said PSK phase component signal and said phase change signal that adjusts said phase portion of said PSK phase component signal in response to said phase change signal, and produces a phase adjusted phase component signal.

17. The apparatus of claim 16 wherein the PSK signal is the I component of a Multiple Phase Shift Keying signal.

18. The apparatus of claim 16 wherein the PSK signal is the Q component of a Multiple Phase Shift Keying signal.

19. The apparatus of claim 16 further comprising:
- a modulator that accepts the phase adjusted phase component signal and produces a modulated signal that is modulated by said phase adjusted phase component signal; and
- an amplifier which receives said modulated signal and adjusts the amplitude of said modulated signal in proportion to said PSK amplitude component signal.

* * * * *